Aug. 16, 1966 — B. FISHMAN ET AL — 3,266,309
MASS FLOWMETER
Filed Dec. 19, 1962 — 2 Sheets-Sheet 1
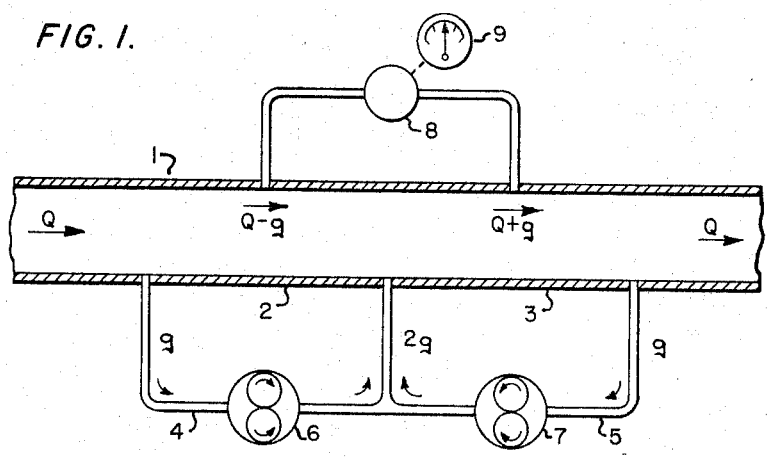
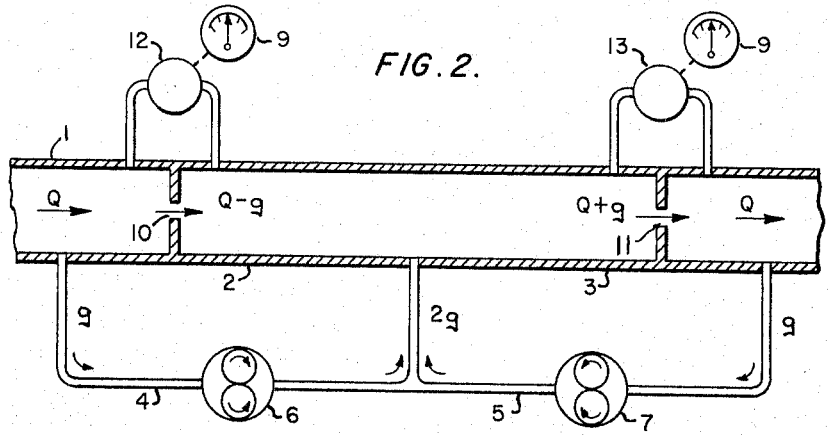
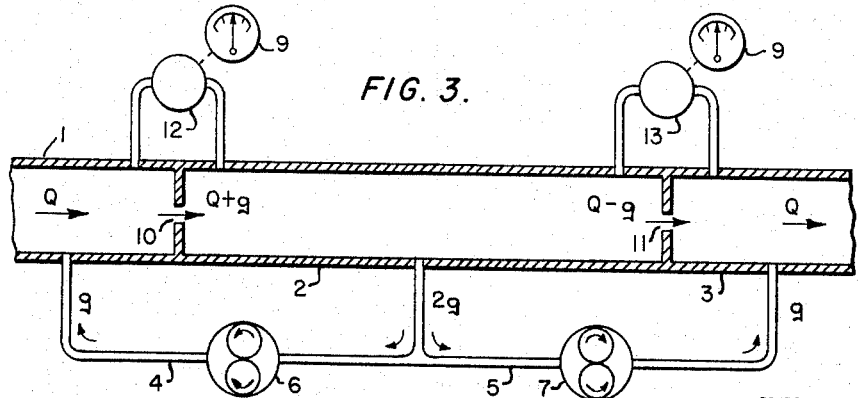
INVENTORS
BERNARD FISHMAN
FREDERICK RYDER

INVENTORS
BERNARD FISHMAN
FREDERICK RYDER 3,266,309
MASS FLOWMETER
Bernard Fishman, New York, and Frederick Ryder, Lynbrook, N.Y., assignors, by mesne assignments, to Flotron Inc., a corporation of New Jersey
Filed Dec. 19, 1962, Ser. No. 245,776
5 Claims. (Cl. 73—205)

This application is a continuation-in-part of the patent application filed July 22, 1958, Serial No. 750,220 in the names of Bernard Fishman and Frederick Ryder, and since issued on January 2, 1962, as U.S. Patent No. 3,015,233.

This invention relates to apparatus adapted to measure rate of flow of fluids and more particularly relates to flowmeters adapted to measure mass flow rate in a linear manner.

Flowmeters adapted to measure the rate of flow through a conduit can usually be classified into one of three types, namely, volumetric, differential pressure, and mass-rate.

In the volumetric flowmeter the flow of liquid causes a propeller or turbine to revolve with an angular velocity proportional to the volume of fluid passing through it. In other embodiments the flow causes rotation of a nutating disc, rotation of an oscillating piston, or reciprocation of plungers. Such volumetric flowmeters require a converter to give actual flow rate. In order to read out mass flow rate, it is necessary that a signal proportional to the density of the fluid be combined with the flowmeter readings.

Differential pressure flowmeters measure flow rate by sensing the differential pressure across an orifice or in a venturi, flow nozzle, pitot tube, or other such device. The velocity head or kinetic energy due to the fluid velocity is measured in this type of meter. Since there is a known relationship between velocity head and fluid velocity for each specific meter, the fluid velocity can be determined by the following formula;

$$V = C\sqrt{2g\Delta \frac{P}{S}}$$

Where:

$V$ = velocity of fluid
$C$ = metering element coefficient
$g$ = gravity constant
$\Delta P$ = differential pressure
$S$ = density of fluid Mass flow rate is equal to:

$$W = SAV = CA\sqrt{2gS\Delta P}$$

Where:

$W$ = mass flow rate
$A$ = area of the metering element cross section

Therefore, using known differential pressure flowmeters to obtain mass flow rate measurements also requires measurement of density and extraction of the square root of the read-out. Further, the differential pressure output signal by itself has a non-linear relationship to the flow rate and cannot be related to either the mass or volumetric flow rate except by including a fluid density factor.

Both the volumetric and differential pressure flowmeters have the additional fault that they will not accurately measure flow rate when the flow is pulsating or during transients. In the measurement of pulsating or transient flows, the accuracy of the volumetric type flowmeter is limited by the poor response characteristics of the known sensing elements. The differential pressure type flowmeter will introduce errors in measuring transient or pulsating flows due to the non-linear flow to read-out relationship.

There are two basic types of mass rate flowmeters, namely, angular momentum and recirculating type meters. In the former, angular momentum is imparted to the flowing fluid by means of a constant speed driving motor and the read-out signal is obtained as a torque. This type of mass rate flowmeter is expensive and tends to require a great deal of maintenance.

In the recirculation type of mass rate flowmeter, recirculation pumps or other such devices are used to obtain a recirculation of a constant volumetric flow in the meter. The meter is essentially a differential pressure type meter in which a constant volumetric flow is added or substracted from the fluid flow being measured. The subject invention is an improved flowmeter of this type.

It is the primary object of this invention to provide a flowmeter which accurately measures transient or pulsating flow as well as steady flow which uses a variable speed pumping means that obtains a linear indication of mass flow rate of fluids inversely proportional to pump speed.

It is an object of this invention to provide a flowmeter which uses a single differential pressure indicator or transducer to obtain a linear indication of mass flow rate of fluids having different densities.

It is another object of this invention to provide such a flowmeter which uses a single differential pressure indicator or transducer for sensing differential pressure across two orifices.

It is another object of this invention to provide such a flowmeter which accurately measures transient or pulsating flow as well as steady flow.

It is another object of this invention to provide such a flowmeter which is inexpensive, simply constructed and requires a minimum of maintenance.

Other objects and a fuller understanding of the invention may be had by referring to the following description and claims taken in conjunction with the accompanying drawings in which:

FIGURE 1 is a schematic drawing of a straight duct type flowmeter utilizing two recirculating pumps and a single differential pressure indicator or transducer;

FIGURE 2 is a schematic drawing of a flowmeter with two orifices, two recirculating pumps and two differential pressure indicators or transducers;

FIGURE 3 is a schematic drawing similar to FIGURE 2 illustrating the different manner of recirculating flow;

Figure 4:
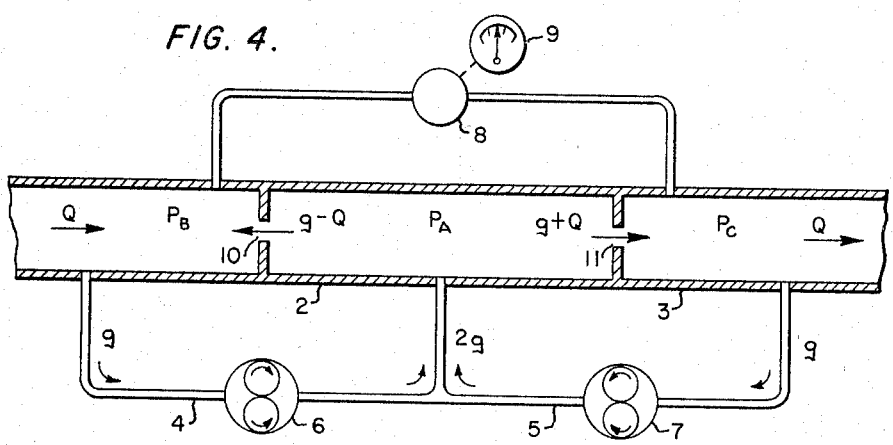
FIGURE 4 is a schematic drawing of a flowmeter of the present invention utilizing two orifices, two recirculating pumps and a single differential pressure indicator or transducer.

FIGURE 1, shows a schematic drawing of a conduit 1 through which variable input and output volumetric flow "Q" is directed. The conduit 1 has two sections 2 and 3 spaced therealong and each of these sections is bridged by branch conduits 4 and 5, respectively, which each have a recirculation pump 6, 7 disposed intermediate the ends thereof. These pumps 6, 7 are necessarily capable of pumping a like volume of flow "q." As shown in FIGURE 1, this flow "q" is smaller than the input flow "Q" and in one instance is subtracted from the input flow adjacent the input end of section 2 and added intermediate sections 2 and 3 by means of branch conduit 4 and pump 6 whereas a like "$q$" is subtracted from the output of section 3 and recirculated via branch conduit 5 and pump 7 to a point intermediate sections 2 and 3. Thus, as shown, the flow through section 2 is "$Q-q$" whereas the flow through section 3 is "$Q+q$." It has been found that by connecting a meter adapted to measure the differential pressure between these sections 2 and 3, such as a differential pressure transducer 8, a reading can be obtained which linearly closely approximates the mass flow rate through the conduit 1.

In accordance with Bernoulli's theorem and ignoring frictional and mixing losses:

(1) $$P_2 + \frac{SV_2^2}{2g} = P_3 + \frac{SV_3^2}{2g}$$

where:

$S$ = density of the fluid
$g$ = gravity constant
$P_2$ = static pressure at section 2
$P_3$ = static pressure at section 3
$V_2$ = velocity at section 2
$V_3$ = velocity at section 3 then:

(2) $$\Delta P = P_2 - P_3 = \frac{S}{2g}(V_3^2 - V_2^2)$$

and if:

$$V = \frac{Qv}{A}$$

where:

$Qv$ = volumetric flow rate
$A$ = area of conduit we can then write Equation 2 as:

(3) $$\Delta P = \frac{S}{2g}\left[\left(\frac{Q+q}{A}\right)^2 - \left(\frac{Q-q}{A}\right)^2\right]$$

and further simplifying:

(4) $$\Delta P = \frac{2SQq}{gA^2} = \frac{2q}{gA^2}(SQ)$$

and if we let:

(6) $$\frac{2q}{gA^2} = K \text{ (a constant in the design)}$$

and since:

$SQ = W$ (mass flow rate)

then:

$\Delta P = KW$ and therefore the differential between the sections 2 and 3 will be directly proportional to the mass flow rate and the transducer's indicator 9 will read out mass flow rate. It should be noted that the directions of recirculating flows "$q$" could be reversed, with the result that the high pressure connection would be at section 3 rather than at section 2.

As stated, a flowmeter constructed in accordance with FIGURE 1 is only approximately accurate and it was found after further experimentation that the accuracy of the meter could be greatly improved by positioning orifices along the conduit.

In FIGURE 2, a flowmeter is shown schematically using two orifices 10, 11 of area $A_1$ and $A_2$ spaced along in the path of flow in the conduit 1 within sections 2, 3 respectively. Both areas are of like size and configuration. Two differential pressure indicators or transducers 12, 13 are used to measure the pressure drops across each of these orifices. If the pumps 6, 7 are connected and pump in the same manner as described in connection with FIGURE 1 the flow equation for each orifice will be:

(7) $$Qv = CA\sqrt{\frac{2g\Delta P}{S}}$$

where:

$Qv$ = volumetric flow rate
$C$ = orifice coefficient
$A$ = area of the orifice
$\Delta P$ = pressure drop across the oriffice
$S$ = density of fluid
$g$ = gravity constant The expression for the flow through orifices 10 and 11 will then be:

(8) $$Q - q = C_{10}A_{10}\sqrt{\frac{2g\Delta P_{10}}{S}}$$

(9) $$Q + q = C_{11}A_{11}\sqrt{\frac{2g\Delta P_{11}}{S}}$$

By squaring and subtracting:

(10) $$4Qq = C_{11}^2 A_{11}^2\left(\frac{2g\Delta P_{11}}{S}\right) - C_{10}^2 A_{10}^2\left(\frac{2g\Delta P_{10}}{S}\right)$$

and if:

$C_{11} = C_{10} = C$ and $A_{11} = A_{10} = A$

Then we can write Equation 10 as

(11) $$4Qq = \frac{2gC^2A^2}{S}(\Delta P_{11} - \Delta P_{10})$$

further:

(12) $$\Delta P_{11} - \Delta P_{10} = \frac{2SQq}{gC^2A^2} = \frac{2q}{gC^2A^2}(SQ)$$

if we let:

$$\frac{2q}{gC^2A^2} = K \text{ (constant) and since: } SQ = W$$

then:

(13) $$\Delta P_{11} - \Delta P_{10} = KW$$

Again, it should be noted that the direction of recirculation flows "$q$" could be reversed, as shown in FIGURE 3, with the result that the greater pressure drop would occur across orifice 10 rather than orifice 11. Therefore, the final mass flow versus differential pressure relationships would be as shown below:

(14) $$\Delta P_{10} - \Delta P_{11} = KW$$

FIGURE 4, shows schematically a flowmeter similar to the flowmeter shown in FIGURE 2, except that the recirculating flows "$q$" are greater than the maximum value of measured flow "$Q$." The flow versus pressure drop relationships for orifices 10 and 11 are then as follows:

(15) $$q - Q = C_{10}A_{10}\sqrt{\frac{2g\Delta P_{10}}{S}}$$

(16) $$q + Q = C_{11}A_{11}\sqrt{\frac{2g\Delta P_{11}}{S}}$$

By squaring and subtracting, and if $C_{10} = C_{11} = C$ and $A_{10} = A_{11} = A$, then we can obtain the same equation as for FIGURE 2, as follows:

(17) $$\Delta P_{11} - \Delta P_{10} = KW$$

Now if the pressure in the conduit between the orifices 10, 11 is designated $P_A$, the pressure on the conduit input side of orifice 10 is designated $P_B$ and the pressure on the conduit output side of orifice 11 is designated $P_C$ then:

(18) $$\Delta P_{11} - \Delta P_{10} = (P_A - P_C) - (P_A - P_B) = P_B - P_C$$

therefore:

(19) $$P_B - P_C = KW = \Delta P$$

where:

$\Delta P$ = pressure drop across flowmeter as shown in FIGURE 4

Figure 5:
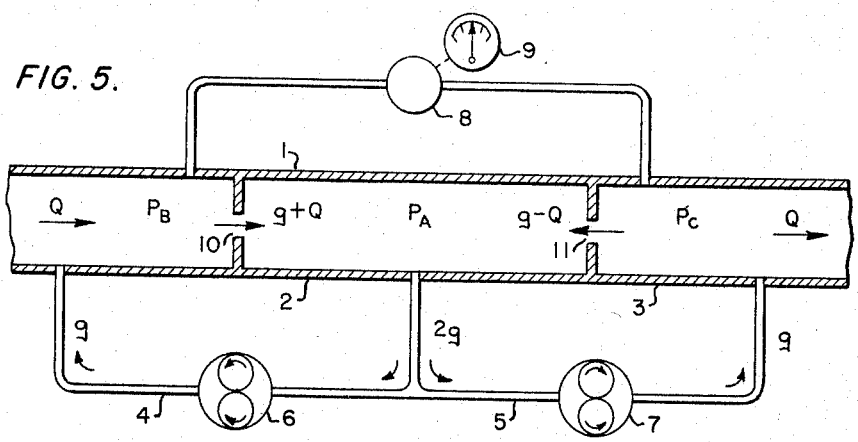
FIGURE 5 is a schematic drawing similar to FIGURE 4 illustrating another manner of recirculating flow.

Again, it should be noted that the direction of recirculation flows "$q$" could be reversed, as shown in FIGURE 5, with the result that the greater pressure drop would occur across orifice 10 rather than orifice 11, but the final mass flow versus indicated differential pressure relationship would be the same as shown in Equation 18, as can be seen below:

(20) $\Delta P_{10} - \Delta P_{11} = (P_B - P_A) - (P_C - P_A) = P_B - P_C$

Figure 6:
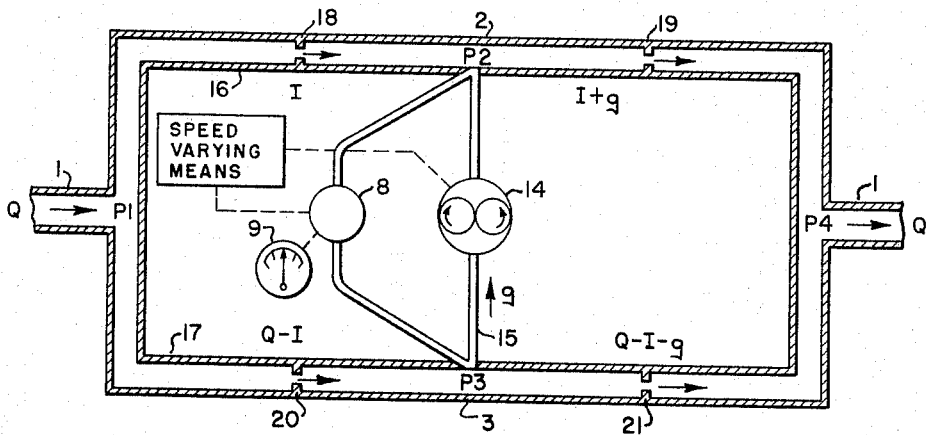
FIGURE 6 is a schematic drawing illustrating another embodiment of the present invention utilizing four orifices, one pump and one differential pressure indicator or transducer.

FIGURE 6 illustrates diagrammatically another embodiment of the present invention which utilizes a single pump 14 to provide a linear read-out of the mass flow rate through the conduit 1 on the meter 9. In this embodiment the input volumetric flow "Q" is divided into two flows "I" and "Q-I" by two like branch conduits 16, 17. Intermediate the ends of these branch conduits 16, 17 they are interconnected by a conduit 15 which has pump 14 disposed intermediate the ends thereof. In this embodiment there are four orifices 18, 19, 20, 21 with two of these orifices disposed in each branch conduit along the path of flow therein and on opposing sides of the point where conduit 15 interconnects these branch conduits 16, 17. The single differential pressure indicator or transducer is connected to the two sections, 2, 3 adjacent the point of joinder of conduit 15 with the branch conduits 16, 17. As stated, the input flow "Q" is divided into two flows "I" and "Q-I" with "I" passing through orifice 18 in branch conduit 16 and with "Q-I" passing through orifice 20 in branch conduit 17.

When the flow "Q-I" reaches connecting conduit 15, pump 14 causes a constant volumetric flow "q" to be withdrawn from conduit 17 and added to conduit 16. This causes the flow through orifice 19 in conduit 16 to be "I+q" and the flow through orifice 21 in conduit 17 to be "Q-I-q." If the pressure upstream and downstream of the four orifices 18, 19, 20 and 21 are designated as $P_1$, $P_2$, $P_3$, and $P_4$, as shown in FIGURE 6, the flows through the four orifices can be expressed in terms of the measured flow "Q" and recirculating flow "q" as follows:

Assume:
$C$ = equal and constant discharge coefficient for all four orifices
$A$ = equal and constant area for all four orifices
$q$ = gravity constant
$S$ = fluid density

(21) $I = CA\sqrt{2g\dfrac{P_1 - P_2}{S}}$

(22) $Q - I = CA\sqrt{2g\dfrac{P_1 - P_3}{S}}$

(23) $I + q = CA\sqrt{2g\dfrac{P_2 - P_4}{S}}$

(24) $Q - I - q = CA\sqrt{2g\dfrac{P_3 - P_4}{S}}$

By squaring the above equations, adding, and letting $K_1 = 2gC^2A^2$ from (21) and (23):

(25) $P_1 - P_4 = \dfrac{S}{K_1}[2I^2 + 2Iq + q^2]$ from (22) and (24):

(26) $P_1 - P_4 = \dfrac{S}{K_1}[2Q^2 + 2I^2 + q^2 - 4IQ - 2qQ + 2Iq]$

By equating (25) and (26):

(27) $I = \dfrac{Q}{2} - \dfrac{q}{2}$ and

(28) $Q - I = \dfrac{Q}{2} + \dfrac{q}{2}$

(29) $I + q = \dfrac{Q}{2} + \dfrac{q}{2}$

(30) $Q - I - q = \dfrac{Q}{2} - \dfrac{q}{2}$

The above four Equations 27 through 30 indicate that the volumetric flow through orifices 18 and 21 will be one-half the difference between the measured and recirculating volumetric flows, and that the volumetric flow through orifices 19 and 20 will be one half the sum of the measured and recirculating volumetric flows. Equations 21 and 22 can then be written as follows:

(31) $1/2(Q - q) = CA\sqrt{2g\dfrac{P_1 - P_2}{S}}$

(32) $1/2(Q + q) = CA\sqrt{2g\dfrac{P_1 - P_3}{S}}$

By squaring and subtracting (31) from (32)

(33) $1/4(Q^2 + 2qQ + q^2) = 2gC^2A^2\left(\dfrac{P_1 - P_3}{S}\right)$

(34) $1/4(Q^2 - 2qQ + q^2) = 2gC^2A^2\left(\dfrac{P_1 - P_2}{S}\right)$

(35) $qQ = 2gC^2A^2\left(\dfrac{P_2 - P_3}{S}\right)$

(36) $P_2 - P_3 = SQ\left(\dfrac{q}{2gC^2A^2}\right)$ whereby:

(37) $\Delta P = K_2 W$ where:

$W = SQ$ = mass flow rate $K_2 = \dfrac{q}{2gC^2A^2}$ $P = P_2 - P_3$

It will be recognized that in the foregoing descriptions of the embodiments of the invention whether one or two pumps are used they must function at a constant speed so that "q" will be constant.

Each of the above embodiments, however, can be operated by keeping the $\Delta P$ or pressure differential constant by regulating the speed of the pump and thus varying "q" to accomplish this objective. This can be done by choosing a reference P and using variable speed pump motors which are controlled by means of known servo mechanisms interconnecting them with the $\Delta P$ sensor whereby the mass flow rate is measured linearly as being inversely proportional to the pump speeds. All of the above formulas can be readily modified to show this relationship. For example, let us refer back to Equation 4 where, $$\Delta P = \dfrac{2SQ_q}{gA^2} = \dfrac{2q}{gA^2}(SQ)$$

Then, equating for $q$ we have, $$\dfrac{1}{q} = \dfrac{2SQ}{gA^2 \Delta P}$$

Now we let $q = nv$ where $n$ = pump revolutions per minute and $v$ = volumetric displacement per revolution of pump which gives us $$\dfrac{1}{nv} = \dfrac{2SQ}{gA^2 \Delta P} \text{ or } \dfrac{1}{n} = \dfrac{2vSQ}{gA^2 \Delta P}$$

We can now let $$K_1 = \dfrac{2v}{gA^2 \Delta P} \text{ (a constant in the design)}$$

Thus, $$\frac{1}{n} = K_1 SQ = K_1 W$$

when $SQ = W$ (mass flow rate). Where previously it was shown that the differential pressure was directly proportional to the mass flow rate, it has now been shown through the above modification to Equation 4 that the pump speed or pump revolutions per minute is indirectly proportional to the mass flow rate. Embodiments of this invention so modified have the advantage that increased accuracy of flow measurement can be obtained in the low flow regions.

Although we have described our invention with a certain degree of particularity, it is understood that the present disclosure has been only by way of example and that numerous changes in the details of construction and the combination and arrangements of parts may be resorted to without departing from the spirit and scope of the invention as hereinafter claimed.

We claim:

1. A mass flowmeter adapted to measure the mass flow rate of an effectively incompressible fluid passing therethrough comprising a main conduit, a pair of branched conduits interconnected to said main conduit intermediate the ends thereof, two pairs of flow restrictors, a respective pair of said flow restrictors positioned in each of said branched conduits in spaced apart relationship along the path of flow of fluid therein, variable speed pumping means for pumping fluid from one of said branched conduits at a location intermediate one pair of flow restrictors into the other of said branched conduits at a location intermediate the other pair of flow restrictors, and means for varying the speed of said pumping means to maintain the differential pressure across two of said flow restrictors constant whereby the speed of said variable speed pumping means is inversely proportional to the mass flow rate of fluid.

2. A mass flowmeter adapted to measure the mass flow rate of liquid passing therethrough comprising a conduit having two flow restrictors with like cross-sectional areas smaller than the cross-sectional area of said conduit in series, means for recirculating flow through the first flow restrictor so that this recirculating flow is additive to the input flow being measured, and means for recirculating a like flow through the second flow restrictor so that this recirculating flow is subtractivce from the input flow being measured, each of these recirculating flows to be larger than the input flow being measured and variable speed pumping means for maintaining the pressure differential constant across the said flow restrictors whereby the mass flow rate is inversely proportional to the speed of said variable speed pumping means.

3. A mass flowmeter adapted to measure the mass flow rate of liquid passing therethrough comprising a conduit having two flow restrictors with like cross-sectional areas smaller than the cross-sectional area of said conduit in series, means for recirculating flow through the first flow restrictor so that this recirculating flow is subtractive from the input flow being measured and means for recirculating a like flow through the second flow restrictor so that this recirculating flow is additive to the input flow being measured, each of these recirculating flows to be larger than the input flow being measured and variable speed pumping means for maintaining the pressure constant across the said flow restrictors whereby the mass flow rate is inversely proportional to the speed of said variable speed pumping means.

4. A mass flowmeter adapted to measure the mass flow rate of liquid passing therethrough comprising a conduit having two flow restrictors with like cross-sectional areas smaller than the cross-sectional area of said conduit in series, means for recirculating flow through the first flow restrictor so that this recirculating flow is additive to the input flow being measured, and means for recirculating a like flow through the second flow restrictor so that this recirculating flow is subtractive from the input flow being measured, each of these recirculating flows to be larger than the input flow being measured and variable speed pumping means for maintaining the pressure constant from immediately upstream of the first flow restrictor to immediately downstream of the second flow restrictor whereby the mass flow rate is inversely proportional to the speed of said variable speed pumping means.

5. A mass flowmeter adapted to measure the mass flow rate of liquid passing therethrough comprising a conduit having two flow restrictors with like cross-sectional areas smaller than the cross-sectional area of said conduit in series, means for recirculating flow through the first flow restrictor so that this recirculating flow is subtractive from the input flow being measured, and means for recirculating a like flow through the second flow restrictor so that this recirculating flow is additive to the input flow being measured, each of these recirculating flows to be larger than the input flow being measured and variable speed pumping means for maintaining the pressure differential constant from immediately upstream of the first flow restrictor to immediately downstream of the second flow restrictor whereby the mass flow rate is inversely proportional to the speed of said variable speed pumping means.

References Cited by the Examiner

UNITED STATES PATENTS

| | | | |
|---|---|---|---|
| 2,660,886 | 12/1953 | Milmore | 73—194 X |
| 2,838,927 | 6/1958 | Gray. | |

RICHARD C. QUEISSER, *Primary Examiner.*

EDWARD D. GILHOOLY, DAVID SCHONBERG,
*Assistant Examiners.*